United States Patent
Rubio et al.

(10) Patent No.: US 11,059,220 B2
(45) Date of Patent: Jul. 13, 2021

(54) DISTRIBUTION OF PRINT AGENT

(71) Applicants: HEWLETT-PACKARD DEVELOPMENT COMPANY, L.P., Houston, TX (US); Leticia Rubio, Sant Cugat del Valles (ES); Utpal Kumar Sarkar, Sant Quirze del Valles (ES); Salvador Sanchez Ribes, Sabadell (ES)

(72) Inventors: Leticia Rubio, Sant Cugat del Valles (ES); Utpal Kumar Sarkar, Sant Quirze del Valles (ES); Salvador Sanchez Ribes, Sabadell (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 395 days.

(21) Appl. No.: 15/745,939

(22) PCT Filed: Oct. 19, 2015

(86) PCT No.: PCT/EP2015/074190
§ 371 (c)(1),
(2) Date: Jan. 18, 2018

(87) PCT Pub. No.: WO2017/067575
PCT Pub. Date: Apr. 27, 2017

(65) Prior Publication Data
US 2018/0215104 A1  Aug. 2, 2018

(51) Int. Cl.
*B29C 64/393* (2017.01)
*B29C 64/209* (2017.01)
(Continued)

(52) U.S. Cl.
CPC .......... *B29C 64/165* (2017.08); *B29C 64/209* (2017.08); *B29C 64/295* (2017.08);
(Continued)

(58) Field of Classification Search
CPC ... B29C 64/165; B29C 64/295; B29C 64/209; B29C 64/393; B33Y 10/00; B33Y 30/00;
(Continued)

(56) References Cited

U.S. PATENT DOCUMENTS

| 8,523,554 B2 | 9/2013 | Tung et al. |
| 8,888,480 B2 | 11/2014 | Yoo et al. |

(Continued)

FOREIGN PATENT DOCUMENTS

| EP | 2363270 | 9/2011 |
| WO | WO-2012085914 | 6/2012 |

(Continued)

OTHER PUBLICATIONS

"3D Printer Improvements"; May 16, 2013; http://www.tridimake.com/2013/05/3d-printing-with-smaller-nozzle-diameter.html.

*Primary Examiner* — Robert J Grun
(74) *Attorney, Agent, or Firm* — HP Inc. Patent Department

(57) ABSTRACT

In an example, a processor comprises an ancillary print agent distribution module to determine instructions for a print control module. The print control module may be to control the distribution of print agent onto a first region of a layer of build material in an object fabrication chamber in an additive manufacturing process in which at least one object is generated by selective solidification of each of a plurality of layers of build material and the selective solidification of build material is determined by the distribution of at least one print agent. The instructions determined by the ancillary print agent distribution module may be to cause the print control module to control the distribution of print agent in a second region of a layer of build material in an object (Continued)

fabrication chamber as part of a process which is ancillary to object generation. The first and second regions may be spatially distinct.

18 Claims, 3 Drawing Sheets

(51) Int. Cl.
| | |
|---|---|
| *B29C 64/35* | (2017.01) |
| *B29C 64/165* | (2017.01) |
| *B29C 64/295* | (2017.01) |
| *B33Y 40/00* | (2020.01) |
| *B33Y 50/02* | (2015.01) |
| *B33Y 10/00* | (2015.01) |
| *B33Y 30/00* | (2015.01) |
| *B29K 105/00* | (2006.01) |

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12); *B29K 2105/251* (2013.01)

(58) Field of Classification Search
CPC .... B33Y 50/02; B33Y 40/00; B29K 2105/251
See application file for complete search history.

(56) References Cited

U.S. PATENT DOCUMENTS

| | | |
|---|---|---|
| 2015/0190967 A1 | 7/2015 | Stava et al. |
| 2016/0151973 A1* | 6/2016 | Juan Jover ............ B29C 64/386 264/462 |

FOREIGN PATENT DOCUMENTS

| | | |
|---|---|---|
| WO | WO-2014079404 | 5/2014 |
| WO | WO-2015108546 | 7/2015 |

* cited by examiner

DISTRIBUTION OF PRINT AGENT

BACKGROUND

Additive manufacturing systems that generate three-dimensional objects on a layer-by-layer basis have been proposed as a potentially convenient way to produce three-dimensional objects.

Additive manufacturing techniques may generate a three-dimensional object through the solidification of a build material. In examples of such techniques, build material is supplied in a layer-wise manner and the solidification method includes heating one or multiple layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
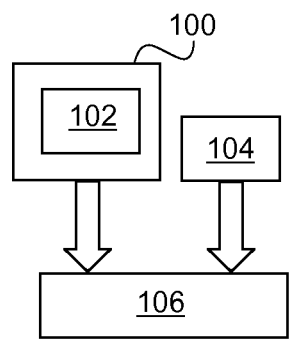
FIG. 1 is a simplified schematic of an example of a processor for controlling the distribution of print agent in an additive manufacturing process.

As noted above, additive manufacturing techniques may generate a three-dimensional object through the solidification of a build material. In some examples, the build material is a powder-like granular material, which may for example be a plastic or metal powder. Build material may be deposited and processed layer by layer, for example within a fabrication chamber. At least one print agent may be selectively applied to the build material, and may be liquid when applied. For example, a coalescing agent (also termed a 'fusing agent') may be selectively distributed onto portions of a layer of build material in a pattern derived from data representing a slice of a three-dimensional object to be generated (which may for example be generated from structural design data). The coalescing agent may have a composition such that, when energy (for example, heat) is applied to the layer, the build material coalesces and solidifies to form a slice of the three-dimensional object in accordance with the pattern. In other examples, coalescence may be achieved in some other manner.

In addition to a coalescing agent, in some examples, a print agent may comprise a coalescence modifier agent (also termed a 'detailing agent'), which acts to modify the effects of a coalescing agent, and which may be selectively distributed onto portions of a layer of build material. Such a coalescence modifier agent may act to reduce coalescence, for example by producing a mechanical separation between individual particles of a build material, or by preventing the build material from heating sufficiently to cause coalescence when energy is applied. In other examples, it may increase coalescence, for example comprising a plasticiser. A coalescence modifier agent may, for example, assist in producing a particular finish or appearance to an object or a portion of an object. A coloring agent, for example comprising a dye or colorant, may in some examples be used as a coalescing agent or a coalescence modifier agent, and/or as a print agent to provide a particular color for the object.

Examples of apparatus for additive manufacturing which utilise 'inkjet' techniques to disperse such agents have been proposed. Such apparatus may comprise a print agent distributor for example in the form of a print head. An example print agent distributor comprises a set of nozzles and a mechanism for ejecting a selected agent as a fluid, for example a liquid, through the nozzles. In such examples, nozzles may become clogged, either partially or wholly, for example when print agents dry within or near the surface of the nozzles (which may have small apertures), and/or when airborne fibres or particles (such as build material particles) enter a nozzle. As high temperatures may be seen during additive manufacturing processes, this can in some examples contribute to the degradation of print heads.

When inkjet techniques are used in additive manufacturing, a print agent distributor may be controlled to 'spit' a print agent into a receptacle which can be referred to as a spittoon. Such 'spitting' may be carried out between or during print operations and can clear nozzles or prevent them from becoming clogged.

FIG. 1 shows an additive manufacturing print control system comprising a processor 100, which may be a processor for controlling an additive manufacturing apparatus. The processor 100 comprises an ancillary print agent distribution module 102. In this example, the ancillary print agent distribution module 102 and an object generation module 104 are to generate instructions for a print control module 106. The print control module 106 is to control the distribution of at least one print agent onto a layer of build material in an additive manufacturing process in which an object is generated by selective solidification of a plurality of layers of build material and the selective solidification of build material is determined by the distribution of at least one print agent. The object generation module 104 is to determine instructions to cause (for example, by execution of the instructions by the print control module 106) the print control module 106 to control the distribution of print agent in the course of object generation in a first region of a layer of build material in an object fabrication chamber. The ancillary print agent distribution module 102 is to determine instructions to cause (for example, by execution of the instructions by the print control module 106) the print control module 106 to control the distribution of print agent in a second region of a layer of build material in an object fabrication chamber as part of a process which is ancillary to object generation. The first and second regions may be spatially distinct.

The distribution of agent as a result of the ancillary print agent distribution module 102 is ancillary to, or supports, the object generation process. In some examples, it may improve and/or control object generation conditions. In some examples, the ancillary process may be a maintenance process. For example, the ancillary print agent distribution module 102 may be to determine instructions to cause spitting of a print agent distributor. As noted above, spitting is a maintenance function, allowing blocked or partially blocked print agent distributor nozzles to be cleared and/or preventing such blockages from occurring. In other examples, the ancillary print agent distribution module 102 may be to determine instructions to control distribution of print agent(s) to improve a thermal condition within a fabrication chamber, and therefore distributes print agent as part of a temperature control process. In some examples, object generation may be controlled such that an object has an intended form, whereas the ancillary process is controlled so as to perform the ancillary function (which may nevertheless, in some examples, result in solidification of build material).

Figure 2:
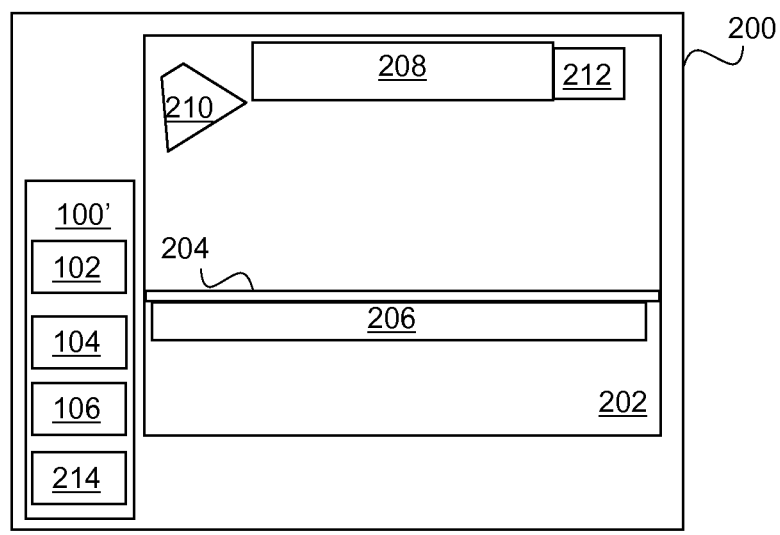
FIG. 2 is a simplified schematic of an example of an additive manufacturing apparatus.

FIG. 2 shows an example of an additive manufacturing apparatus 200 comprising a processor 100', which in this example comprises all the modules 102, 104, 106 discussed in relation to the system shown in FIG. 1. The apparatus 200 further comprises a fabrication chamber 202 in which an object is formed, and which comprises a print bed 204, which in this example can be raised or lowered within the chamber 202. The print bed 204 or build material thereon is heated by a heat source 206. A print agent distributor 208 selectively delivers at least one print agent (which may include any, or any combination of, a coalescing agent, a coalescence modifier agent, a coloring agent or the like) onto portions of a layer of a build material arranged on the print bed 204 within the fabrication chamber 202. In some examples, the print agent distributor 208 is a print head comprising a plurality of nozzles, which may be scanned across the surface of the print bed 204. An energy source 210 to cause coalescence and a print agent distributor detector 212 to determine print agent distributor performance parameters are further provided. In this example, the processor 100' comprises, in addition to the modules 102, 104, 106 described in relation to FIG. 1, a nozzle monitor 214.

In this example, the apparatus 200 is to generate a three-dimensional object in a layer wise manner from a granular build material. The print bed 204 (and thereby the material thereon) is heated by the heat source 206 to raise the temperature of granular build material thereon (in this example so that build material on the bed 204 is at a substantially stable, consistent, temperature which is below, but relatively close to, the melting temperature of the build material) and print agent(s) selectively applied thereto from the print agent distributor 208. The heat source 206 therefore substantially controls the temperature of at least a portion of the print bed 204 or the material thereon. In other examples, a heat source may heat the build material on the print bed directly, rather than via the print bed, for example heating a surface thereof. In some examples, a heat source may have a different orientation with respect to the print bed 204 than is shown in FIG. 2, for example being above and directed towards an upper surface of the print bed 204. The energy source 210 provides additional energy which is preferentially absorbed by portions of the build material which bear coalescing agent, raising the temperature to the melting temperature and causing coalescence thereof. The print bed 204 may be moved downwards as a new layer of granular build material is applied thereto.

In additive manufacturing, the blockage of a nozzle may at least indirectly affect the shape or form of a generated object and/or its structural properties. In some examples, 'one pass' printing is used, in which a print agent distributor 208 passes over a layer once to apply a particular agent, rather than multiple times. Thus, there may be no second pass to allow for compensation for a non-functioning nozzle, and the same non-functioning nozzle may result in a missed application of print agent on multiple layers, possibly leading to voids or the like within the object. This may result in an object being generated which departs from its intended appearance, strength, or other characteristics.

Because, in this example, ancillary agent distribution process(es) (in this example comprising spitting) is/are carried out within the chamber 202, such process(es) can be carried out during an additive manufacturing operation without the print agent distributor 208 being removed from the chamber 202 or the agents ejected into a discreet spittoon, which would consume extra time. Moreover, because the first and second regions are spatially distinct, the ancillary agent distribution process does not interfere with object generation, and/or spitting can be controlled without taking into account the effect of the agents (or the combination of agents) which are ejected to cause the object to be generated. In other words, in object generation, specific agent combinations may be specified to generate a particular object, but there may be no such restrictions for ancillary processes, which may therefore prioritise factors such as the intended effect of the process.

In some examples, the second region (i.e. the region in which the ancillary print agent distribution module 102 controls distribution of agents) is in the periphery of the fabrication chamber 202. In particular examples, the first region, in which an object is formed, may be towards the centre of each layer formed, whereas the second region may be arranged about at least part of the periphery of the central region. It may be the case that there are thermal edge effects in additive manufacturing apparatus. While the centre of a bed 204 may be maintained at a relatively stable temperature (in this example, by the heat source 206), heat exchange between the edges of the bed 204 or a layer of build material thereon, the apparatus housing and the external environment may mean that the temperature towards the edges of the bed 204 may be less uniform. For example, it may be the case that a region of a layer of build material near the wall of the chamber 202 is cooler than the centre of the chamber 202, and therefore there is a temperature gradient near the chamber walls. This can result in warping of the shape of generated objects. For this reason, objects may be generated such that they are within a boundary, for example, at least 1 cm or 1.5 cm away from the wall of the fabrication chamber.

However, by performing ancillary operations, such as spitting, in the peripheral region, which may be at least partially (and in some examples wholly) beyond that boundary, a region of the chamber 202 which would otherwise be unused is utilized. For example, nozzle maintenance/recovery can be achieved without halting the additive manufacturing process. In another example, the ancillary print agent distribution process may be controlled to treat build material the peripheral region in a manner which may increase the thermal stability of the first region. In some examples, the ancillary print agent distribution process may be intended to at least partially counter any adverse temperature edge effects.

In this example, the nozzle monitor 214 receives information from the print agent distributor detector 212 which is indicative of an operational state (e.g. the health, or blockage state) of at least one of the nozzles in the print agent distributor 208 and the ancillary print agent distribution module 102 determines instructions to cause the print control module 106 to control the spitting print agent(s) according to this information. For example, the ancillary print agent distribution module 102 may determine instructions to cause the print control module 106 to preferentially spit print agent(s) from a blocked or partially blocked nozzle of the print agent distributor 208. The print agent distributor detector 212 may be arranged to determine performance parameters for the print agent distributor 208, and may for example comprise any, or any combination of, a drop detector to monitor whether agents are ejecting drops as intended, a camera observing where agent is applied to the build material, at least one temperature monitor monitoring the temperature of at least one nozzle, or the like. In some examples, this information may be supplied in 'real time' and a new spitting scheme or strategy (for example, a new or modified print mask as set out below) may be determined in response to a monitor 214 determining (for example from data received) that a particular nozzle is not functioning as intended. Such a new strategy may be intended to recover a blocked nozzle or clear a partially blocked nozzle by causing those nozzles to spit more than other, 'healthy', nozzles. Such a new strategy may be implemented even while an object generation process is on-going (bearing in mind that, in some examples, an object generation process may take a significant time, for example hours).

In some examples, the instructions generated by the object generation module 104 and/or the ancillary print agent distribution module 102 are in the form of at least one print mask. A surface may be divided into pixels and a print mask may specify how a printing fluid is applied to a pixel in a particular printing operation. For example, a print mask may specify whether a drop is applied to a pixel or not in a particular pass. In some examples, a print mask may set operating parameters such as the number of print passes to achieve an intended print agent density, a maximum number of drops per pixel, and the like. A print mask may for example specify a drop application pattern for all passes of a multi-pass print agent distributor 208, and may be used in conjunction with a print agent map, specifying which agent is to be applied at which location (for example, which color, or coalescing agent, or the like). Where the print agent distributor 108 comprises an array of nozzles, a print mask may control when drops of agent are ejected from a particular nozzle. In some examples, at least one print mask may be provided for each layer in object generation, and/or for each print agent, and may provide print instructions for all or for at least one portion of the layer. Print masks may be different for different layers, or a single print mask may be used for multiple layers. Multiple print masks corresponding to different portions of a layer may be 'tiled' to cover a combined area of a print bed.

The ancillary print agent distribution module 102 may for example determine a print mask to cause the print control module 106 to control the spitting of print agent(s) in the second region for each of a plurality of layers. The determined print mask(s) may be to cause the print control module 106 to control the spitting of print agent(s) in the peripheral region of the object fabrication chamber 202.

Figure 3:
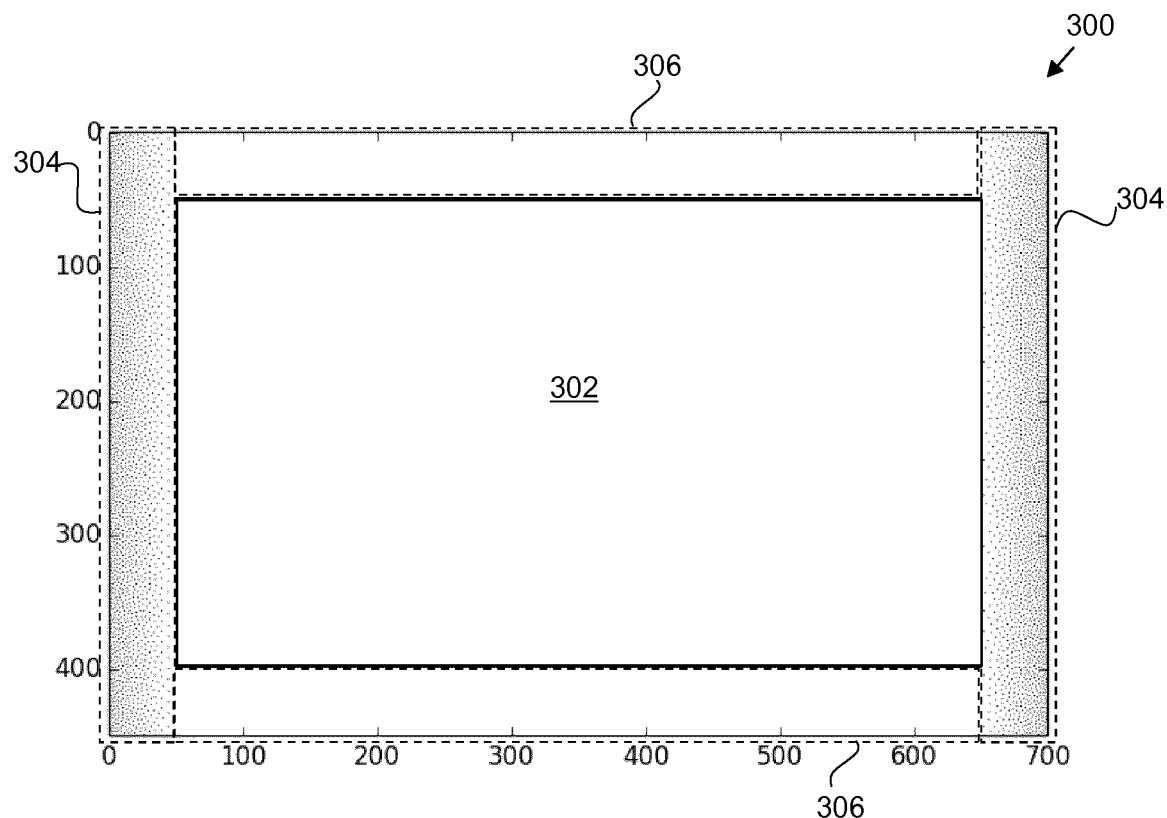
FIG. 3 is an example of a printing mask.

An example of a print mask 300 is shown in FIG. 3. The print mask 300 may be used to specify where drops of print agent are applied to at least a region of a layer of build material within a fabrication chamber. A print mask 300 may comprise a binary matrix, with a 1 corresponding to a pixel where a drop of agent is to be applied and a 0 where a pixel should be left free of agent. In this example, the print mask 300 is in the form of a frame, comprising a central cut-out 302, which corresponds in this example to a region of the layer of build material which is for object generation (i.e. for the generation of at least one object). The frame, in this example, corresponds to a peripheral region of the print bed or of build material arranged on the print bed. In some example, this peripheral region comprises regions or zones of a print bed in which object generation may be avoided due to thermal edge effects and/or less accurate temperature control than is seen over other regions. A separate print mask may be determined for object generation, which may correspond to at least a region of the cut-out 302, or the print instructions for the object may be provided in some form other than a print mask.

In this example, the print mask 300 comprises four substantially rectangular regions arranged about the central cut-out 302. Two opposed end regions 304 of the print mask 300 have a dot pattern indicating where drops of print agent are to be applied (for example, a dot may be indicative of a '1' in a binary matrix). It may be noted that the dot pattern has a ramped density of dots, the purpose of which is explained in greater detail below. Two opposed side regions 306 are blank: this is interpreted as an instruction that the portion of the layer of build material corresponding to the side regions 306 will be left clear of agent when this print mask is applied.

In this example, the print agent distributor 208 will fully overlie the end regions 304 whereas just a portion of the print agent distributor 208 will overlie side regions 306 of the print mask 300. Therefore, ancillary agent distribution activities in this example occur in the end regions 304 to allow agent distribution from all nozzles. However, in other examples, a print mask 300 may comprise instructions to print in the side regions 306. More generally, any region overlying a print bed may have a print mask determined therefor.

A print mask 300 may be determined for each agent the print agent distributor 108 distributes. For example, a particular agent may be dispensed in a single pass, and a different agent may be dispensed in a subsequent pass. A print mask for a coalescing agent may be relatively dense if solidification is intended, and relatively sparse if it is intended that the build material remains unfused. In some examples, a plurality of print masks may be predetermined.

In other examples, a processing apparatus (such as an ancillary print agent distribution module 102) may be capable of determining a print mask to cause the print control module to control the distribution of print agent(s) in a second region, for example according to a predetermined mask generation method. Such a method may for example use or specify parameters such as a drop distribution scheme (for example any or any combination of: random distribution, blue noise distribution, green noise distribution, ramped distribution, increased spitting from blocked nozzles or the like), an interlayer scheme (such as print on alternating layers with a particular agent, or every three layers, or the like), a measure of drop density, an intended solidification state and the like. In some examples, at least one of these parameters may be determined using a feedback loop. For example, a temperature of the build material may be monitored. If the temperature is lower than anticipated, a drop density for a coalescent agent may be increased. If it is higher than expected, a drop density for a coalescent agent may be reduced. If a nozzle is found to be blocked, spitting frequency from that nozzle may be increased (but may be kept below a threshold so as not to cause coalescence and/or so as to allow the build material to be reused).

In some examples, reuse of un-fused build material may be determined depending on the concentration of print agents within build material. Build material may, in some examples be recycled if it contains up to a threshold level of print agent concentration. Build material which has been treated with print agents may be mixed with untreated build material, which may reduce the concentration and allow for reuse of relatively heavily treated build material. In some examples, the concentration of print agents applied to the build material may be determined bearing in mind reusability, for example being controlled so as to be below a threshold. The reusability of build material is in some examples reduced by the heating process, separately from the concentration of agent applied thereto.

Other combinations of factors may result in drop distribution schemes being generated or selected in order to address particular operational states. There may be at least one default drop distribution scheme (which may be that there is no ancillary print agent distribution) which is used unless operational parameters vary beyond a threshold, which may trigger the generation or selection of a different drop distribution scheme. Different drop distribution schemes (e.g. different print masks) may be intended to address different issues or have different purposes, and/or may be intended to address several issues.

As noted above, the edges of the chamber 202 may suffer in particular from thermal edge effects. However, there is no hard boundary to such effects, which can continue (albeit to a reduced extent) into the interior of the chamber 202. The peripheral region in which object generation is avoided may therefore be defined based on a compromise between providing a large object generation volume and reducing the risk of unwanted warping. In some examples the peripheral region used for ancillary print agent distribution processes may comprise or extend into a region which is suitable for object generation. For example, if the object or objects to be generated will not occupy the whole of the interior, temperature controlled, region of the chamber 202, ancillary printing activities such as spitting and thermal control may be carried out in unoccupied portions of the interior region.

In an example now described, build material within a peripheral region of a chamber may be treated with agent so as to increase the thermal stability of the object generation region, allowing that region to have a larger volume and/or to increase the consistency of objects generated therein.

In one example, a print agent distribution (or 'firing') scheme (for example implemented using a print mask) may be determined for the peripheral regions which results in firing print agent into the peripheral region to increase the thermal stability of the central zone and thereby enhance the part quality of the parts printed close to the edge (or reduce the risk of detrimental effects).

In some examples, a density 'ramp' (for example as shown in FIG. 3) may be used with increased agent being applied near the outer boundary (where edge effects are most pronounced). The application of a coalescing agent in additive manufacturing processes tends to result in a local increase in temperature (for example, as the build material to which agent has been applied preferentially absorbs energy), and applying agent according to a density ramp may therefore counteract a temperature drop which may be seen towards the walls of a chamber 202. The gradient of the ramp may be determined based on actual measured temperatures within a fabrication chamber in which at least object is being generated, or may be predetermined.

Print agent may be applied so as to be below a threshold concentration. This may be so as to avoid solidification, as this may simplify downstream processing of the objects generated and/or to allow build material powder to be reused. Concentration of agent may be controlled for example by ensuring that the amount of coalescing agent is below a threshold (a relatively low density print mask, for example, a low density blue noise mask, may be used), or by interspersing layers treated with coalescing agent with untreated layers. In some examples, solidification may be hindered by interspersing coalescing agent with a coalescence modifier, which may hinder coalescence. In other examples, print agent may be applied to have a concentration to cause solidification.

The print mask 300 shown in FIG. 3 is an example of a print agent distribution scheme having a density ramp, using a blue noise distribution. The density of dots in the end regions 304 increases towards the ends of the fabrication chamber. A print agent distributor 208 may print such a pattern on a first pass using a coalescing agent and then on a second pass print a different pattern, such as a standard blue noise pattern, using a coalescence modifying agent such as a print agent intended to reduce coalesce. This may allow a relatively high concentration of agent (in some examples, up to a threshold density), and therefore a more pronounced increase in temperature at the walls of a fabrication chamber.

This is just one of many examples of a print agent distribution pattern for an ancillary process. In other examples, a print mask may be determined to provide any or any combination of: a print agent distribution that maximizes homogeneity for a given density, a random distribution (which may be easy to implement), a distribution that minimizes firing frequency for each nozzle (and, or up to, or of at least, a given density) while maximizing homogeneity, a distribution scheme which is determined according to the objects to be printed and their predicted thermal behaviour and/or their effect (or likely effect) on the print head; a distribution with bursts or even clusters of spitting; a fully regular distribution (it may be possible to achieve high homogeneity and to use all nozzles with such a distribution).

A print mask may be used in at least one region not used for object generation (e.g. a peripheral region) for each agent on each layer, or some or all agents may be applied to some or all layers in a layer-wise manufacturing process. The distribution scheme in such a region may vary (even during a print operation) or may be consistent.

Print masks may also be used for object generation, i.e. to control the application of agents to produce a three-dimensional object having an intended form and/or characteristics. Print masks may be 'tiled' to provide print instructions spanning all or part of the addressable surface of a layer of build material Further print masks may be used to coordinate printing between print agent distributors. It may be the case that a plurality of print agent distributors is provided, each corresponding to a different (although in some cases, overlapping) addressable portion of a print bed. These masks may be termed weaving or interleaving masks. In an example, there may be three print heads, which have two overlap areas between them. In the overlap region, a pixel could be addressed by either of the two associated agent distributors, for example print heads—i.e. there is nozzle redundancy, and a determination of which nozzle may be used to supply agent to a particular pixel should be made. This may for example comprise splitting agent delivery between the two print heads.

Figure 4:
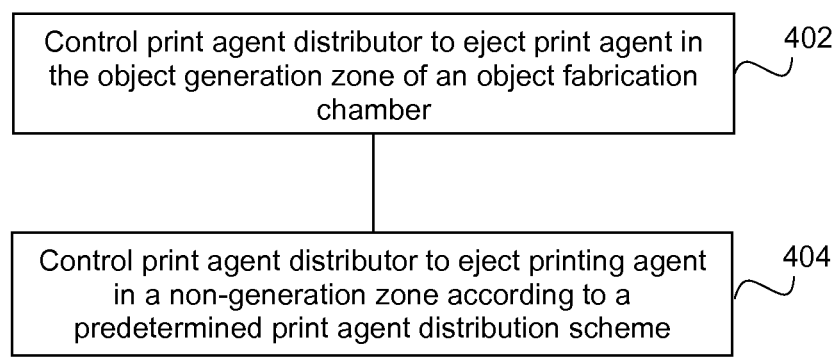
FIG. 4 is a flowchart of an example of a method of controlling the distribution of print agent in an additive manufacturing process.

FIG. 4 is a flow chart of a method for use in an additive manufacturing apparatus having an object fabrication chamber comprising an object generation zone, in which the temperature is substantially controlled by the object generation apparatus and a non-generation zone, in which factors external to the object generation apparatus substantively affect the temperature (for example resulting in a temperature gradient, or a lower temperature than in the object generation zone). In block 402, a print agent distributor is controlled to eject print agent in the object generation zone of an object fabrication chamber to cause selective solidification of a build material to generate at least one three dimensional object in a layer-wise manner. The pattern in which print agent is applied may for example be specified to generate a slice of an object having a predetermined form and, in some examples, characteristics. In block 404, the print agent distributor is controlled to eject print agent in the non-generation zone (which may comprise a peripheral zone) according to a predetermined print agent distribution scheme. In some examples, the predetermined print agent distribution scheme may also extend into regions of the object fabrication chamber in which temperature is substantially controlled by the object generation apparatus. In some examples, the region in which the object is formed is spatially distinct from the region in which predetermined print agent distribution scheme is carried out.

Such a method may be carried out for each of a plurality of layers in an additive manufacturing system and/or for each of a plurality of agents. The predetermined print agent distribution scheme may be different for different layers and/or agents. In some examples, at least one print agent distribution scheme may be determined, selected or varied during generation of an object.

The non-generation zone may comprise a peripheral zone, which may extend around all or part of an object fabrication chamber. Different regions within the non-generation zone may be associated with different print agent distribution strategies.

In some examples, the method may comprise controlling the print agent distributor to eject print agent in the non-generation zone to affect a temperature in the build material in the non-generation or in the object generation zone. For example, print agent(s) may be distributed so as to at least in part compensate for or counteract a thermal edge effect in a peripheral region. A print agent distribution scheme may be selected or determined accordingly.

In some examples, the method may comprise causing the print agent distributor to eject print agent in the non-generation zone to clear blocked or partially blocked nozzles of the print agent distributor. This may for example be based on 'real time' information concerning the operative effectiveness or 'health' of a nozzle (for example, in the form of performance parameters for the print agent distributor). In other examples, a print agent distribution scheme may be predetermined to cause the print agent distributor to eject print agent in the non-generation zone to maintain the health of the print agent distributor.

The method may be carried out by computing apparatus, for example a processor or the like.

Figure 5:
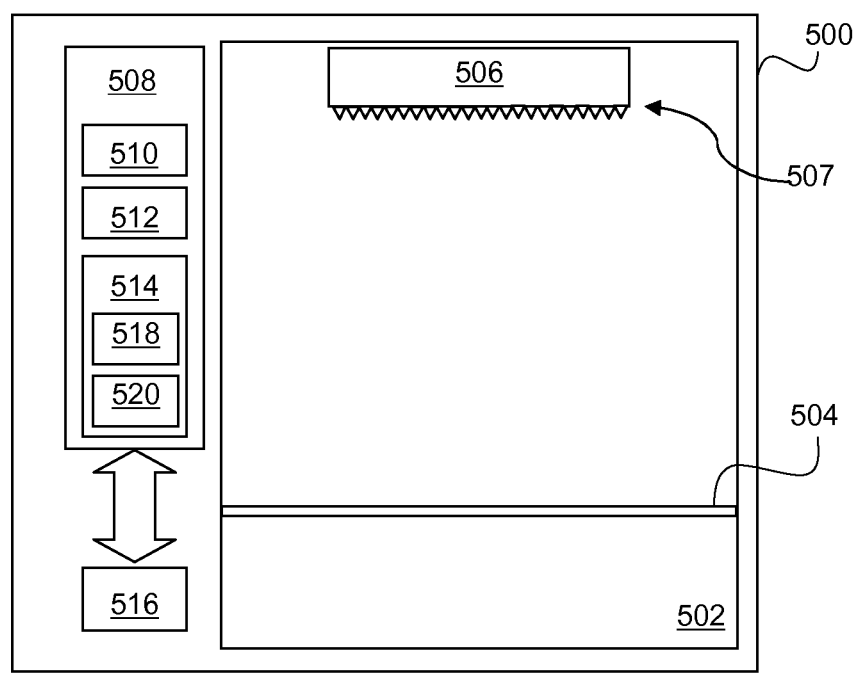
FIG. 5 is a simplified schematic of another example of an additive manufacturing apparatus.

FIG. 5 is another example of an additive manufacturing apparatus 500. The apparatus 500 comprises an object fabrication chamber 502 comprising a print bed 504, a print head 506 and a controller 508.

The print head 506 is to distribute at least one liquid print agent onto a layer of build material on the print bed 504 and in this example comprises a plurality of nozzles 507. The controller 508 comprises a print control module 510 to control the distribution of print agent(s) by the print head 506; an object generation module 512 to determine instructions to cause the print control module 510 to generate a three dimensional object by distributing print agent(s) to allow selective fusing over a first region of the layer of build material in the course of three dimensional object generation, and an ancillary print agent distribution module 514 to determine instructions to cause the print control module 510 to distribute print agent over a second region of the layer of build material as part of at least one of a print head maintenance process or a temperature control process. The first and second regions are spatially distinct. The controller 508 is in communication with a memory 516, which may store data and/or machine readable instructions which, when executed, cause the controller 508 to act as described herein.

In this example, the ancillary print agent distribution module 514 comprises a print head maintenance module 518 to determine instructions to cause the print control module 510 to control the distribution of print agent(s) over a second region of the layer of build material to maintain the functionality of the print head. This therefore performs a print head maintenance process. The ancillary print agent distribution module 514 further comprises a temperature control module 520 to determine instructions to cause the print control module 510 to control the distribution of print agent(s) over a second region of the layer of build material to affect a temperature in the build material. This may be, for example, to control or compensate for thermal edge effects within the chamber 502.

The controller 508 may comprise, or function as, the processor 100, 100' of FIG. 1 or FIG. 2. The apparatus 500 may have any combination of the components or the features described in relation to the apparatus 200 of FIG. 2, and vice versa. The ancillary print agent distribution module 102 described in relation to FIG. 1 may have any of the features described in relation to the ancillary print agent distribution module 514 of FIG. 5 and vice versa.

It may be noted that control of agent distribution in the regions of a fabrication chamber 202, 502 which are not used for object generation can be carried out independently from control of object generation processes, and can be independently varied, for example according to the apparatus used, environmental conditions, printing mode, materials, real-time data measurements and the like. However, in some examples, the same methods of control (for example, use of print masks) may be used for both agent distribution in the regions of the chamber which are not used for object generation and for control of object generation processes, and thus can be employed without significant alteration to the object generation pipeline or apparatus.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to a flow chart and block diagrams of the method, devices and systems according to examples of the present disclosure. Although the flow diagram described above shows a specific order of execution, the order of execution may differ from that which is depicted. It shall be understood that each flow and/or block in the flow chart and block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus (such as the processor 100 or the controller 508) may execute the machine readable instructions. Thus functional modules of the apparatus and devices may be implemented by a processor executing machine readable instructions stored in a memory, or a processor operating in accordance with instructions embedded in logic circuitry. The terms 'processor' and 'controller' are to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example, the memory 516) that can guide the computer or other programmable data processing devices to operate in a specific mode. Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   in an additive manufacturing apparatus, having an object fabrication chamber comprising an object generation zone, in which a temperature is substantially controlled by object generation, and a non-generation zone, in which factors external to the object generation affect the temperature,
   controlling a print agent distributor to eject print agent in the object generation zone of the object fabrication chamber to result in selective solidification of a build material to generate at least one three dimensional object in a layer wise manner,
   controlling the print agent distributor to distribute more of the print agent in the non-generation zone according to a predetermined print agent distribution scheme, and
   causing the print agent distributor to distribute print agent in the non-generation zone to affect a temperature in the build material.

2. A method according to claim 1 wherein the additive manufacturing apparatus comprises a processor comprising an ancillary print agent distribution module, the method further comprising:
   with the print agent distribution module, determining instructions for a print control module, wherein the print control module is to control the distribution of the print agent by the print agent distributor onto a first region of a layer of build material in the object generation zone of the object fabrication chamber in the additive manufacturing process in which at least one object is generated by selective solidification of each of a plurality of layers of build material and the selective solidification of build material is determined by the distribution of the print agent,
   the instructions being to cause the print control module to control the distribution of print agent onto a second region of a layer of build material in an object fabrication chamber as part of a process which is ancillary to object generation, wherein the first and second regions are spatially distinct.

3. A method according to claim 2 wherein:
   the print agent distribution module is to determine instructions to cause the print control module to control the distribution of print agent in a layer wise manner, and is further to determine a print mask to cause the print control module to control the distribution of print agent in the second region for each of a plurality of layers.

4. A method according to claim 2 in which the second region comprises a peripheral region of the object fabrication chamber.

5. A method according to claim 2 wherein:
   the print agent distribution module is to determine instructions to cause the print control module to control the distribution of print agent in the second region of an object fabrication chamber as part of at least one of a print agent distributor maintenance process and a temperature control process.

6. A method according to claim 2 further comprising, with a nozzle monitor, determining an operational state of a print agent distributor nozzle and the print agent distribution module is to determine instructions to cause the print control module to control the distribution of print agent in response to the determined operational state.

7. A method according to claim 2 wherein the print agent distribution module is to determine instructions for the print control module to distribute print agent in greater quantities from a blocked or partially blocked nozzle of the print agent distributor than from a fully functional nozzle.

8. A method according to claim 2 wherein the print agent distribution module is to determine instructions to cause the print control module to control the distribution of print agent in the second region to be below a threshold concentration.

9. A method according to claim 2 in which the print agent distribution module is to determine a print agent distribution scheme to cause the print control module to control the distribution of print agent in the second region by at least one of (i) selecting a print agent distribution scheme from a plurality of predetermined print agent distribution schemes, and (ii) generation of a print agent distribution scheme.

10. A method according to claim 1 comprising causing the print agent distributor to distribute print agent in the non-generation zone to clear a blocked or partially blocked nozzle of the print agent distributor.

11. A method according to claim 1 comprising causing the print agent distributor to distribute print agent in the non-generation zone to maintain the health of the print agent distributor.

12. The method of claim 1, wherein the predetermined print agent distribution scheme comprises an increase in a density of print agent in the non-generation zone, where the density of print agent increases from the generation zone to an end of the fabrication chamber.

13. An additive manufacturing apparatus comprising: an object fabrication chamber comprising a print bed, the apparatus further comprising a controller comprising: a print control module programmed to control the distribution of print agent onto a layer of build material by a print head, the print head being programmed or controlled to selectively distribute at least one liquid print agent onto a layer of granular build material on the print bed, wherein the apparatus is configured to generate at least one object by selective fusing of regions of each of a plurality of layers of build material and the fusing of build material is controlled by distribution of at least one print agent; an object generation module programmed to determine instructions to cause the print control module to control the distribution of print agent to control selective fusing in a first region of the layer of build material in the course of three dimensional object generation; and an ancillary print agent distribution module programmed to determine instructions to cause the print control module to control the distribution of print agent over a second region of the layer of build material as part of at least one of a print head maintenance process and a temperature control process, and programmed to cause the print control module to distribute print agent in the second region of the layer of build material to affect a temperature in the first region of the build material.

14. An additive manufacturing apparatus according to claim 13 in which the ancillary print agent distribution module comprises a print head maintenance module to determine instructions to cause the print control module to control the distribution of print agent over a second region of the layer of build material to maintain the functionality of the print head.

15. An additive manufacturing apparatus according to claim 13 in which the ancillary print agent distribution module comprises a temperature control module to determine instructions to cause the print control module to control the distribution of print agent over a second region of the layer of build material to affect a temperature in the build material.

16. A method of operating an additive manufacturing apparatus that comprises an object fabrication chamber comprising an object generation zone in which a number of three-dimensional objects is formed and a non-generation zone including a peripheral area surrounding the object generation zone that is not used when forming three-dimensional objects, the method comprising:
 controlling a print agent distributor to eject print agent into a build material in the object generation zone of the object fabrication chamber to result in selective solidification of the build material to generate the number of three-dimensional objects in a layer wise manner,
 controlling the print agent distributor to also distribute more of the same print agent in the non-generation zone according to a predetermined print agent distribution scheme, and
 causing the print agent distributor to distribute print agent in the non-generation zone to affect a temperature in the build material.

17. The method of claim 16, further comprising ejecting the print agent from a particular nozzle of the print agent distributor to in the non-generation zone so as to clear blockage of that particular nozzle.

18. The method of claim 16, wherein the predetermined print agent distribution scheme comprises an increase in a density of print agent in the non-generation zone, where the density of print agent increases from an edge of the generation zone to an end of the fabrication chamber.

* * * * *